(12) United States Patent
Shieh

(10) Patent No.: US 7,283,949 B2
(45) Date of Patent: Oct. 16, 2007

(54) SYSTEM, METHOD AND PROGRAM PRODUCT FOR BIDIRECTIONAL TEXT TRANSLATION

(75) Inventor: Winston Tsu-Rong Shieh, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 10/408,147

(22) Filed: Apr. 4, 2003

(65) Prior Publication Data

US 2004/0199373 A1 Oct. 7, 2004

(51) Int. Cl.
*G06F 17/28* (2006.01)

(52) U.S. Cl. .............................. 704/4; 704/2
(58) Field of Classification Search ............ 704/4, 704/2
See application file for complete search history.

(56) References Cited

U.S. PATENT DOCUMENTS

| | | | |
|---|---|---|---|
| 5,384,701 A | 1/1995 | Stentiford et al. | |
| 5,867,811 A | 2/1999 | O'Donoghue | |
| 5,983,169 A | 11/1999 | Kozma | |
| 6,085,162 A | 7/2000 | Cherny | |
| 6,161,083 A * | 12/2000 | Franz et al. | 704/4 |
| 6,370,498 B1 | 4/2002 | Flores et al. | |
| 6,393,389 B1 | 5/2002 | Chanod et al. | |
| 6,405,162 B1 | 6/2002 | Segond et al. | |
| 6,453,280 B1 | 9/2002 | Yang | |
| 2002/0087301 A1 | 7/2002 | Jones et al. | |
| 2002/0111789 A1 | 8/2002 | Hull | |
| 2002/0123880 A1 | 9/2002 | Brown | |

OTHER PUBLICATIONS

Huang, Shihong. Tilley, Scott. Issues of Content and Structure for a Multilingual Web Site, Proceedings of the 19th Annual International Conference on Computer Documentation. Santa Fe, NM. Oct. 21-24, 2001, p. 103-110.*
Sobashima et al., 'A Bidirectional Transfer-Driven Machine Translation System for Spoken Dialogues', Proceedings of the 15th conference on Computational Linguistics—vol. 1, pp. 64-68, Kyoto, Japan; 1994.*

* cited by examiner

*Primary Examiner*—David Hudspeth
*Assistant Examiner*—Justin W. Rider
(74) *Attorney, Agent, or Firm*—Andre Gibbs; Hoffman, Warnick & D'Alessandro

(57) ABSTRACT

A system, method, and program product for translating text. The invention provides a bidirectional translation corpus that is used to translate phrases from a first language to a second language and vice versa. The bidirectional translation corpus has multiple entries, each having a phrase in the first language and a corresponding phrase in the second language. A source phrase is compared with each entry in the bidirectional translation corpus to determine if it matches one of the entries. If a match is found, the corresponding phrase is used as a translated phrase. Otherwise, the phrase is translated using a translation system.

18 Claims, 3 Drawing Sheets

SYSTEM, METHOD AND PROGRAM PRODUCT FOR BIDIRECTIONAL TEXT TRANSLATION

BACKGROUND OF THE INVENTION

1. Technical Field

The invention generally relates to a system, method and program product for the bidirectional translation of text. Specifically, the invention provides a bidirectional translation corpus that can be selectively used to translate phrases between two languages.

2. Background Art

With the increasing worldwide popularity of the Internet, the importance of automated, and accurate translations of text has grown. For example, a web page could include text that is originally in the Spanish language. However, the viewing user may actually be located in the United States and wish to view the text in the English language. To date, either alternate web pages have been provided allowing the user to view an alternate set of English language web pages, or a "machine translation" technology/program has been used for translating the text of the web pages. Use of an alternate set of web pages is not desirable since it increases the amount of storage required, and updating the web site requires updating multiple pages. However, current machine translation technology does not consistently provide the most accurate translations.

One common problem for translating text arises when a word used in a source language has more than one meaning, and therefore more than one corresponding word in a destination language. This results in a "one to many" relationship between the word in the source language and words in the destination language. For example, the word "eagle" has a different meaning in a sports-related article than it would in a nature-related article. However, current machine translation technology would translate the word into the same destination language word in both instances (if the subject area is not known to the translation system). In general, the word in the destination language that corresponds to the most frequently used definition of the word will be selected.

Some approaches have been proposed for addressing this problem. Many of these approaches provide a database (lexicon) having entries that can only be used for translations in a single direction. For example, many approaches require a first entry for an English to Spanish translation, and a second entry for a Spanish to English translation. As a result, two entries must be stored and maintained (in two separate unidirectional lexicons) to perform bidirectional translations. Further, many approaches only provide context-based translation on a word-by-word basis, rather than on entire phrases (i.e., a group of words or a complete sentence). As a result, these approaches do not consider any grammatical differences that may be appropriate for different contexts. Current approaches also perform poorly when an expression is used that has a meaningless translation in another language. For example, the French expression "C'est la vie" is meaningless when literally translated into Chinese or Spanish. For example, in Spanish, it would be more accurate to translate the phrase as "Que sera sera." Translation of such expressions can result in erroneous "round trip" interpretations. For example, when the English phrase "out of sight, out of mind" is translated into Russian and then back into English, one approach yields "invisible infinity." Still further, many context-based approaches do not address situations when the context for a word changes within the same sentence. For example, the sentence "the airplane crash caused the stock market to crash" uses the word "crash" in two different contexts. Many current context-based approaches would select one context or the other for the entire sentence, which results in an incorrect translation of at least one of the occurrences of "crash."

The increasing popularity of web portal pages further complicates the translation of web content. A portal page is customized to deliver aggregated, personalized content to a computer user. Typically, a portal page is rendered and delivered to a viewing user from a portal server. A portal program such as WebSphere Portal Server, which is commercially available from International Business Machines Corp. of Armonk, N.Y. is loaded on the portal server. The portal program generally obtains and aggregates web content into a portal page. As is known in the art, a portal page includes sections or portlets that each contain particular web content formatted according to a user's preferences. For example, a user could establish his/her own portal page that has sections for news, weather, sports, etc. When the portal page is requested, the portal program would obtain the desired web content from the appropriate content providers. Once obtained, the portal content would be aggregated, and then displayed as a portal web page. This portal technology has lead to the explosion of personalized "home" pages for individual web users (e.g., MY.YAHOO.COM), which only increases the need for phrase-by-phrase translations of web content.

In view of the foregoing, there exists a need for a system, method and program product for the bidirectional translation of text, wherein a bidirectional translation corpus is used to translate phrases between two languages. Further, there exists a need to implement such a system, method, and program product for translating web content that may be provided via portal pages.

SUMMARY OF THE INVENTION

The invention provides a system, method, and program product for the bidirectional translation of phrases (e.g., clauses). Specifically, a bidirectional translation corpus is provided that includes multiple entries each of which includes a first phrase in a first language and a corresponding second phrase in a second language. When translating a phrase, it is first determined if the phrase matches any of the entries in the bidirectional translation corpus. If a match is found, the corresponding phrase is used as a translated phrase. Otherwise, the phrase is translated using a translation system (e.g., a "machine" translation program). This results in bidirectional translations of text that are faster, more cost efficient, and more accurate than current approaches.

A first aspect of the invention provides a method of translating web content including a source phrase, the method comprising: providing a bidirectional translation corpus comprising a plurality of entries, each entry having a first phrase in a first language and a corresponding second phrase in a second language; determining if the source phrase matches the first phrase in any entry in the bidirectional translation corpus; and using the second phrase as a translated phrase if a match is determined.

A second aspect of the invention provides a system for translating web content including a source phrase, the system comprising: a bidirectional translation corpus comprising a plurality of entries, each entry having a first phrase in a first language and a corresponding second phrase in a second language; a matching system for determining if the source phrase matches the first phrase in any entry in the bidirectional translation corpus; and a phrase system for using the second phrase as a translated phrase if a match is determined.

A third aspect of the invention provides a computer program product comprising a computer useable medium having computer readable program code embodied therein for translating web content having a source phrase, the program product comprising: program code configured to manage a bidirectional translation corpus comprising a plurality of entries, each entry having a first phrase in a first language and a corresponding second phrase in a second language; program code configured to determine if the source phrase matches the first phrase in any entry in the bidirectional translation corpus; and program code configured to use the second phrase as a translated phrase if a match is determined.

The exemplary aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various embodiments of the invention taken in conjunction with the accompanying drawings in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a system, method, and program product for the bidirectional translation of phrases (e.g., clauses). Specifically, a bidirectional translation corpus is provided that includes multiple entries each of which includes a first phrase in a first language and a corresponding second phrase in a second language. When translating a phrase, it is first determined if the phrase matches any of the entries in the bidirectional translation corpus. If a match is found, the corresponding phrase is used as a translated phrase. Otherwise, the phrase is translated using a translation system (e.g., a "machine" translation program).

It is understood that, as used throughout this application, the term "phrase" means a group of words. A phrase may be an entire sentence or a portion of a sentence such as a phrase or a clause. Further, as used herein, the term "context" means the environment in which the phrase is used. The context can be based, for example, on a subject area of the text (e.g., weather or sports related), a source and/or destination language for the translation, a display attribute (e.g., number of characters available) for a destination display system, etc.

Figure 1:
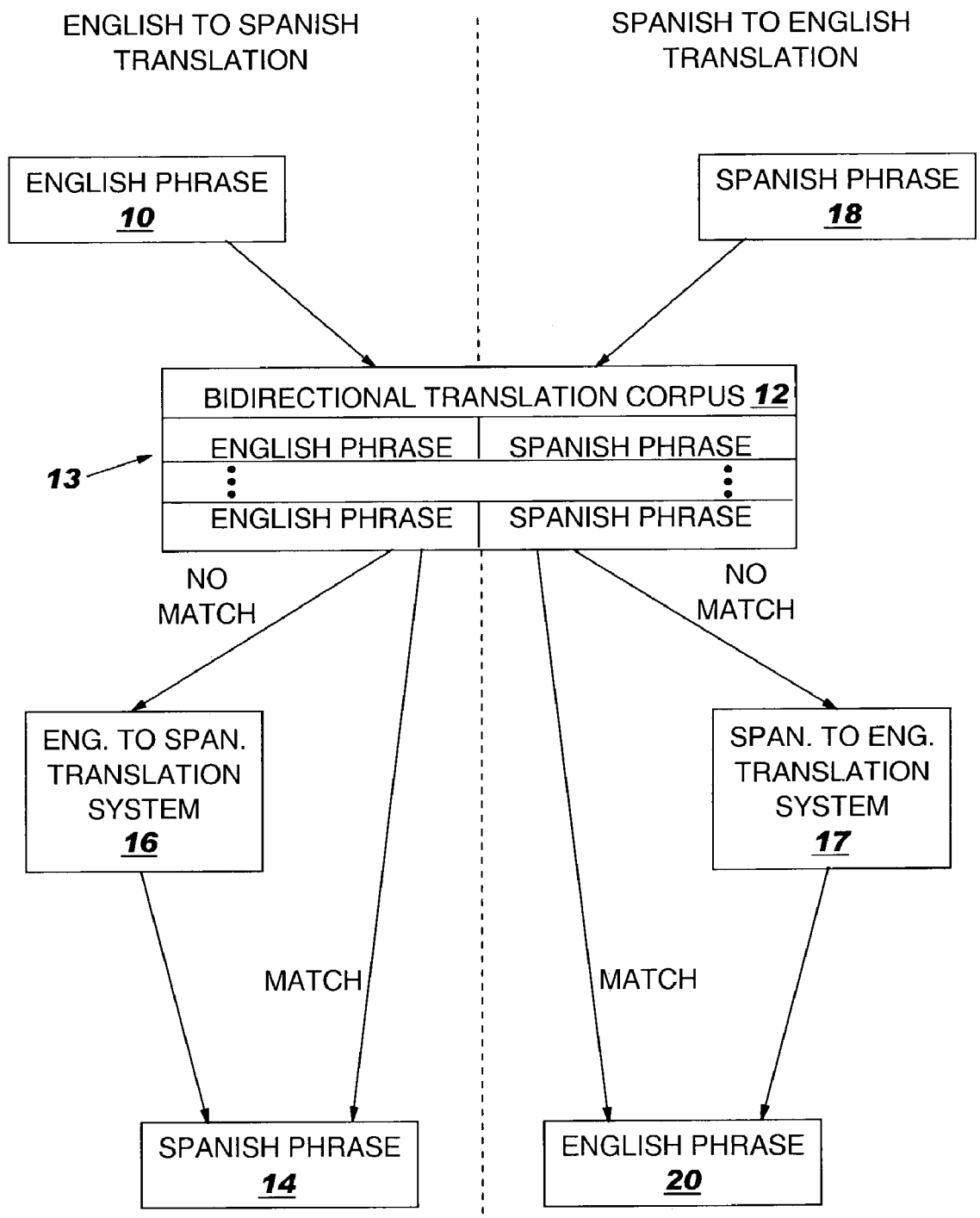
FIG. 1 depicts an illustrative flow diagram according to one embodiment of the invention.

Turning to the figures, FIG. 1 shows a flow diagram for English to Spanish and Spanish to English translations performed according to the present invention. As shown, an English phrase 10 is provided to an (illustrative) bidirectional translation corpus 12. Bidirectional translation corpus 12 includes multiple entries 13. Each entry 13 includes an English phrase and its corresponding Spanish phrase. Entries 13 in a particular bidirectional translation corpus 12 can be limited to a certain context. For example, corpus "A" could include only sports-related phrases, while corpus "B" contains only weather-related phrases. In one embodiment, entries 13 are typically human translated. Alternatively, entries 13 could be machine translated. Moreover, entries 13 can be managed automatically and/or by an administrator. For example, a new entry 13 can be added after a particular phrase is translated by a translation system (program) or by a human. Additionally, entries 13 that have not been accessed for an extended period of time can be automatically or manually purged from bidirectional translation corpus 12 in order to reduce overhead and improve performance.

Upon receiving English phrase 10, it is determined if English phrase 10 matches the English phrase in any of entries 13 included in bidirectional translation corpus 12. A match can be provided when an exact match is found. Alternatively, a grammatical/statistical matching approach can be used as known in the art. In the case of the latter, a match is returned when a threshold similarity between the phrases is reached. Should more than one entry 13 return a match, an entry 13 having a greater similarity to English phrase 10 can be used.

If a match is found, entry 13 in bidirectional translation corpus 12 is used to obtain the corresponding Spanish phrase 14, which is used as the translated phrase of English phrase 10. When an identical match is not found, the corresponding Spanish phrase in bidirectional translation corpus 12 may require some modification before being returned. For example, the English phrase in an entry 13 in bidirectional translation corpus 12 may be "He shot an eagle." An English phrase 10 may be provided that comprises "George shot an eagle." In this case, before Spanish phrase 14 is returned, the pronoun "he" should be replaced with the proper noun "George."

However, when a match for English phrase 10 is not found in any entry 13 in bidirectional translation corpus 12, English phrase 10 is provided to an English to Spanish translation system 16. English to Spanish translation system 16 can be any translation system (program) now known or later developed such as WebSphere Translation Server available from International Business Machines Corp. To this extent, English to Spanish translation system 16 can generate an English language structure based on a grammatical analysis of English phrase 10, convert the English language structure into a Spanish language structure, and then generate the Spanish phrase using the Spanish language structure. It is understood, however, that any system for translating phrases between two languages can be used. Other examples include using a direct string pattern matching approach, translating into an intermediary language (e.g., Esperanto) before translating into the destination language, performing a statistical analysis to generate a destination phrase without applying linguistic rules, or any combination of these approaches.

As shown, a similar flow is followed when translating a Spanish phrase 18 into an English phrase 20. Specifically, the same bidirectional translation corpus 12 can be used to perform the Spanish to English translation. In this case, the Spanish phrase in each entry 13 is consulted for a match and the corresponding English phrase 20 in an entry 13 is returned should a match be found. If no match is found, a Spanish to English translation system 17 is used to translate the phrase. As can be seen, the present invention requires only a single bidirectional translation corpus 12 to be provided and managed in order to implement translation of phrases in both directions between two languages.

Use of a particular bidirectional translation corpus 12 could optionally be selected from multiple bidirectional translation corpora 12 based on a context of the source phrase (e.g., English phrase 10 or Spanish phrase 18). For example, bidirectional translation corpora 12 can be provided for sports-related phrases and weather-related phrases. Should the context of the source phrase be sports, the sports-related bidirectional translation corpus 12 would be used. Similarly, should the context of the source phrase be weather, the weather-related bidirectional translation corpus 12 would be used. However, if a bidirectional translation corpus 12 does not exist for the particular context, the source phrase could be provided directly to the translation system as known in the art. Similarly, different bidirectional translation corpora 12 could be used dependent on the source and/or destination language. To this extent, the destination language and/or the source language could be specified or determined automatically based on an analysis of the character data. Regardless, an appropriate bidirectional translation corpus 12 is chosen that includes entries 13 having phrases in the source language and corresponding phrases in the destination language.

As discussed, the invention can be used to translate phrases that are present in web content. A context for the web content can be selected by a web content provider, or automatically determined by analyzing the content. When the present invention is implemented in conjunction with a portal server, an administrator can specify what context applies for the web content within a portlet and/or a source language for the portlet content. Subsequently, when a portal page containing the portlet is generated for display, a destination language can be determined and a bidirectional translation corpus can be selected based on the source language, destination language, and/or context.

It should be understood in advance that as known in the art, the term "portlet" is used to refer both to the visual sections of a portal page, as well as to the program code used to obtain the web content from web providers for display in the visual sections. Thus, a portlet should be understood to have at least two manifestations: (1) a "visual" portlet displayed as part of a portal page; and (2) a "program" portlet that includes the program code for obtaining the web content displayed in the visual portlet. In addition, as used herein, the term "web content" is intended to refer to any type of content that can be delivered on a portal page and can be subject to language translation. Examples of such web content include, among other things, textual material, hyperlinks, etc.

Figure 2:
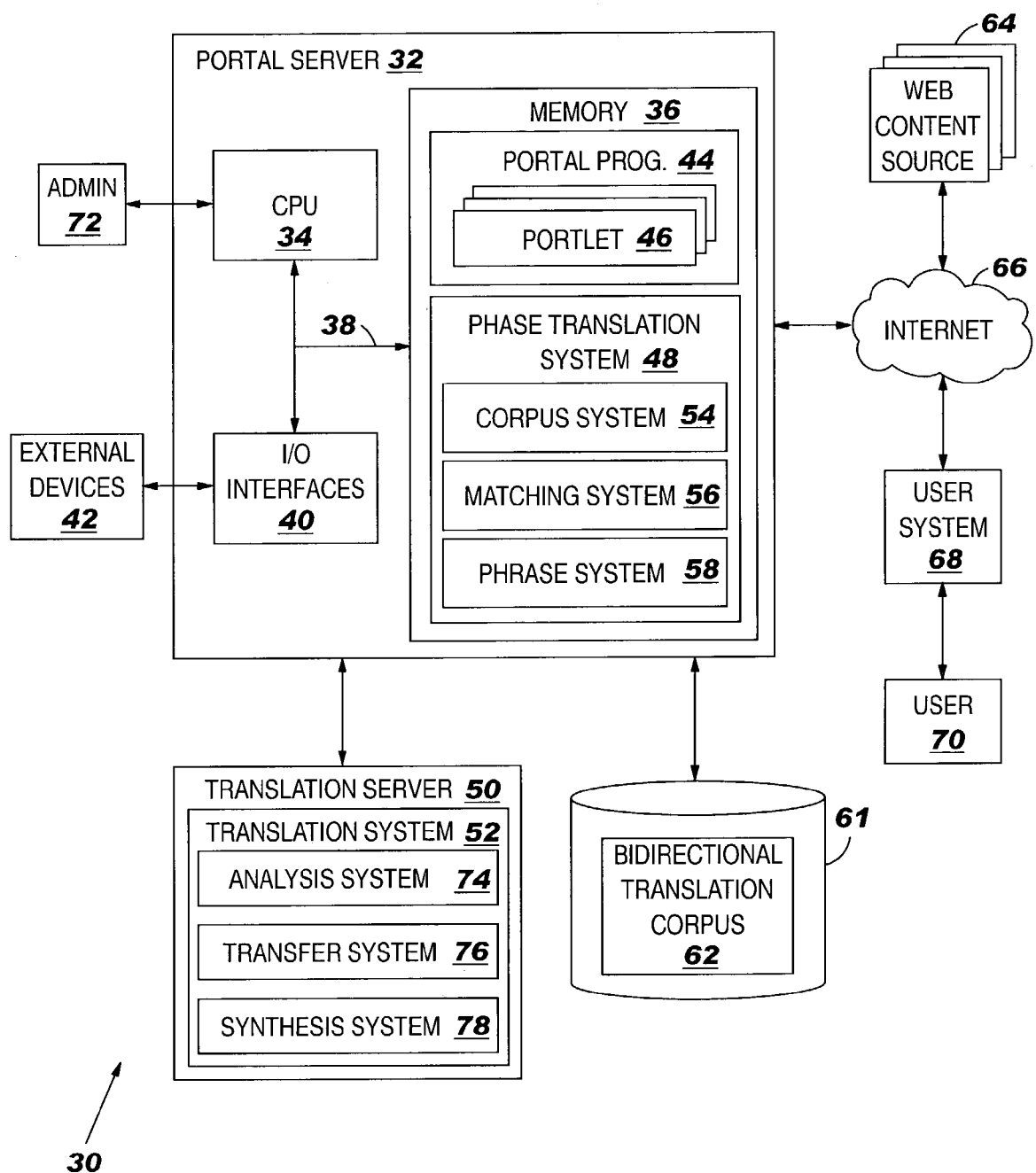
FIG. 2 depicts a system for translating web content using a bidirectional translation corpus.

FIG. 2 depicts a system 30 for translating web content using a bidirectional translation corpus 62. As depicted, system 30 includes portal server 32, which provides portal pages to web users (e.g., user 70). As described above, a portal page is generally a web page that has one or more portlets (e.g., sections) into which web content is arranged. Each portlet can have a different type of web content (e.g., sports, news, business, etc.). To this extent, it is common for users 70 to customize their own portal pages. For example, user 70 could customize his/her own MY.YAHOO.COM portal page. Such a portal page would be delivered to user system 68 by portal server 32.

In general, portal server 32 includes central processing unit (CPU) 34, memory 36, bus 38, input/output (I/O) interfaces 40, external devices/resources 42, and storage unit 61. CPU 34 may comprise a single processing unit, or be distributed across one or more processing units in one or more locations, e.g., on a client and server. Memory 36 may comprise any known type of data storage and/or transmission media, including magnetic media, optical media, random access memory (RAM), read-only memory (ROM), a data cache, a data object, etc. Moreover, similar to CPU 34, memory 36 may reside at a single physical location, comprising one or more types of data storage, or be distributed across a plurality of physical systems in various forms.

I/O interfaces 40 may comprise any system for exchanging information to/from an external source. External devices/resources 42 may comprise any known type of external device, including speakers, a CRT, LED screen, hand-held device, keyboard, mouse, voice recognition system, speech output system, printer, monitor/display, facsimile, pager, etc. Bus 38 provides a communication link between each of the components in portal server 32 and likewise may comprise any known type of transmission link, including electrical, optical, wireless, etc. In addition, although not shown, additional components, such as cache memory, communication systems, system software, etc., may be incorporated into portal server 32.

Storage unit 61 provides storage for data bidirectional translation corpus 62 of the present invention. As such, storage unit 61 could include one or more storage devices, such as a magnetic disk drive or an optical disk drive. In another embodiment, storage unit 61 includes data distributed across, for example, a local area network (LAN), wide area network (WAN) or a storage area network (SAN) (not shown). Storage unit 61 may also be configured in such a way that one of ordinary skill in the art may interpret it to include one or more storage devices.

It should be understood that although not shown for brevity purposes, translation server 50 and user system 68 will typically include computerized components (e.g., CPU, memory, etc.) similar to portal server 32. In addition, although referred to as "servers," portal server 32 and translation server 50 can actually be any type of computerized system (e.g., workstation, hand-held device, etc.) capable of performing the functions described herein. It should also be appreciated that user system 68 can be any type of computerized system capable of receiving and displaying portal pages and/or other web content (e.g., server, client, workstation, hand-held device, etc.). Still yet, it should be understood that although shown as single, separate computerized units, portal sever 32 and translation server 50 could actually include several computerized units or be combined into one computerized unit.

Communication between portal server 32, translation server 50, user system 68 and web content sources 64 can occur in any known manner. In the illustrative embodiment shown in FIG. 2, user system 68 and web content sources 64 communicate with portal server 32 over Internet 66, while translation server 50 communicates with portal server 32 directly or over a private network. However, this need not be the case. Rather, communication among any of the systems could occur via a direct hardwired connection (e.g., serial port), or an addressable connection in a client-server (or server-server) environment that may utilize any combination of wireline and/or wireless transmission methods. In the case of the latter, the server and client may be connected via Internet 66, a wide area network (WAN), a local area network (LAN), a virtual private network (VPN) or other private network. The server and client may utilize conventional network connectivity, such as Token Ring, Ethernet, WiFi or other conventional communications standards. Where the client communicates with the server via Internet 66, connectivity could be provided by conventional TCP/IP sockets-based protocol. In this instance, the client would utilize an Internet service provider to establish connectivity to the server.

Stored in memory 36 of portal server 32 is portal program 44 and phrase translation system 48. Portal program 44 can be any program capable of obtaining and aggregating web content into portlets of a portal page (e.g., WebSphere Portal Server). Under the present invention, portal program 44 includes "program" portlets 46. "Program" portlets can receive/obtain web content from web content sources 64 (e.g., Associated Press, CNN, ESPN, etc.) in any known fashion. Phrase translation system 48 is used to translate phrases within web content. Phrase translation system 48 is shown including a corpus system 54, a matching system 56, and a phrase system 58 that implement various functions of phrase translation system 48 as discussed further below.

As indicated above, delivery of web content in a portal page to user 70 could require translation of one or more source phrases from a source language to a destination language. For example, the web content for a portlet 46 as received from one of web content sources 64 could be in the Spanish source language, while user 70 could require the web content in the English destination language. Since a translation is required, source phrases in the web content would be communicated to phrase translation system 48. Phrase translation system 48 includes a corpus system 54 that manages one or more bidirectional translation corpora 62. For example, corpus system 54 adds, deletes, and modifies entries in each bidirectional translation corpus 62. Corpus system 54 may also select one of bidirectional translation corpora 62 to use in translating a phrase based on a context of the phrase (e.g., based on subject area, source language, destination language, etc.). Should no bidirectional translation corpus 62 be appropriate for the context of a particular phrase, corpus system 54 (or phrase system 58) can disable use of bidirectional translation corpus 62 and communicate the phrase to translation system 52 for translation.

However, when an appropriate bidirectional translation corpus 62 is available, corpus system 54 identifies/provides the bidirectional translation corpus 62 to matching system 56. Matching system 56 determines if the source phrase matches the first phrase in any of the entries in bidirectional translation corpus 62. When a match is found, the second phrase of the entry is forwarded to phrase system 58. Phrase system 58 performs, if necessary, any required alterations to the second phrase and returns the second phrase to portal program 44 as a translated phrase. However, when a match is not found, phrase system 58 can forward the source phrase to translation server 50.

Translation server 50 includes a translation system 52. Translation system 52 can be or incorporate any known "machine" translation program(s) such as WebSphere Translation Server. Translation system 52 includes an analysis system 74, a transfer system 76, and a synthesis system 78. Each of these systems implements various functions required to translate text from a first language to a second language as known in the art. It is understood, that while shown separately, portal program 44, phrase translation system 48, and translation system 52 can be implemented as a single system or in any combination of fewer systems (e.g., phrase translation system 48 can be included as part of portal program 44 or translation system 52). Alternatively, it is understood that some or all of portal program 44, phrase translation system 48, and/or translation system 52 can be implemented on one or more additional systems. Further, phrase translation system 48 and/or translation system 52 can be implemented as part of or communicate directly with web content source 64 and/or user system 68. The configuration shown and discussed is illustrative only.

Figure 3:
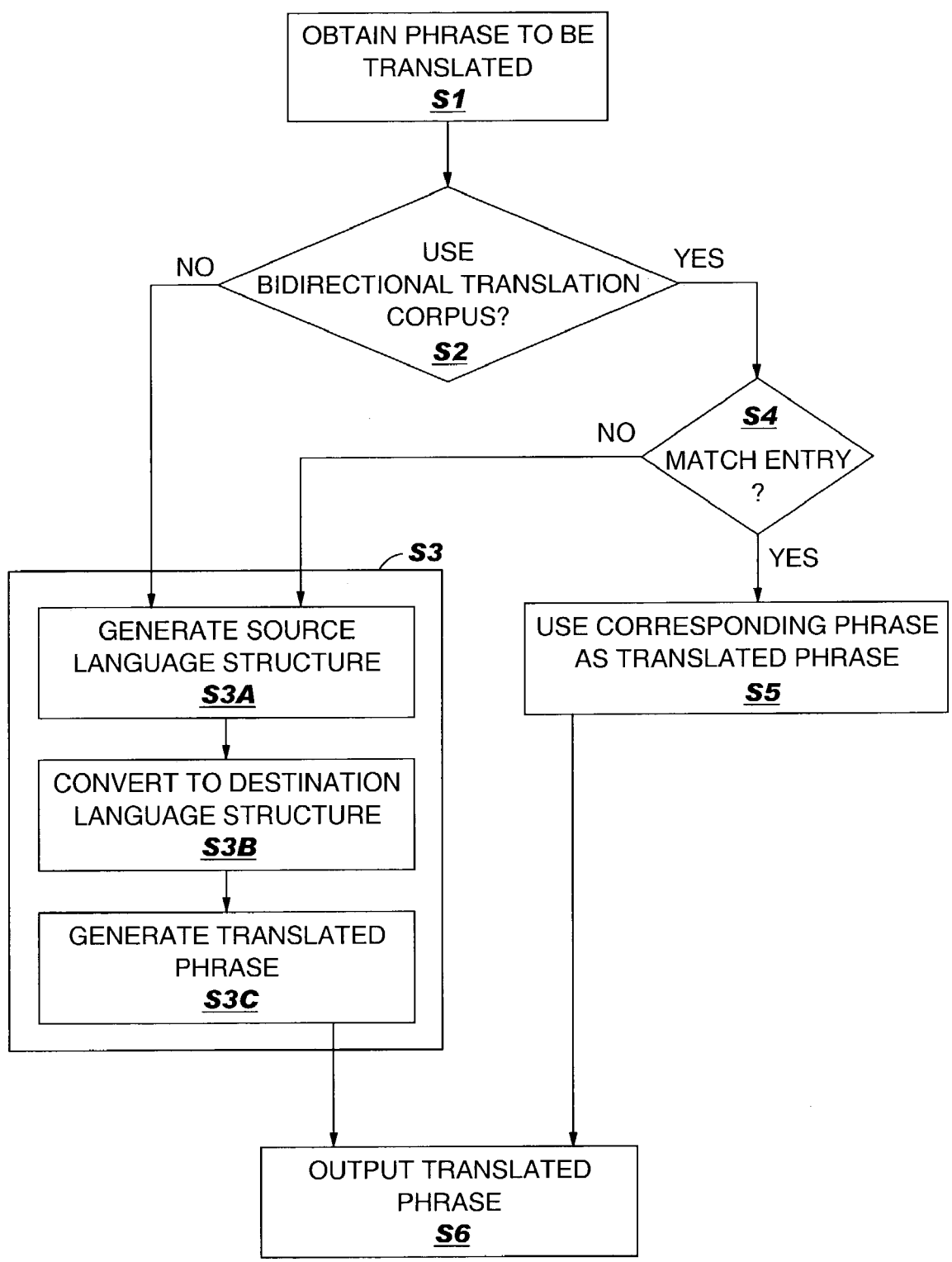
FIG. 3 depicts illustrative method steps according to another embodiment of the invention.

The operation of phrase translation system 48 and translation system 50 are now described more fully with reference to FIG. 3. FIG. 3 shows the various method steps that implement one embodiment of the invention. In step S1, phrase translation system 48 (FIG. 2) obtains a phrase to be translated from, for example, portal program 44. In step S2, corpus system 54 determines whether to use a bidirectional translation corpus 62. If bidirectional translation corpus 62 is not to be used, then the process flows to step S3. However, if bidirectional translation corpus 62 is used, then in step S4, matching system 56 determines if any entry in bidirectional translation corpus 62 matches the phrase to be translated. If no match is found, then the process flows to step S3. However, if a match is found, then in step S5, the corresponding phrase in the matching entry is used as the translated phrase. In step S6, phrase system 58 provides the translated phrase back to portal program 44.

In step S3, phrase system 58 forwards the phrase to translation system 52 for translation, which translation can occur according to any method now known or later developed. For example, in step S3A, analysis system 74 generates a source language structure based on the phrase. The source language structure is built by analyzing the grammar of the phrase, and removes many of the grammatical details included in the phrase. In step S3B, transfer system 76 converts the source language structure to a destination language structure. This step comprises possibly reordering the location of some of the portions of the phrase based on grammatical rules of the destination language. In step S3C, synthesis system 78 uses the destination language structure to generate the translated phrase that is returned to phrase system 58. In step S6, phrase system 58 provides the translated phrase back to portal program 44.

It should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purpose of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of translating web content including a source phrase, the method comprising:
    providing a bidirectional translation corpus comprising a plurality of entries, each entry having a first phrase in a first language and a corresponding second phrase in a second language, wherein the bidirectional translation corpus implements translation of phrases from the first language to the second language and from the second language to the first language;
    selecting the bidirectional translation corpus from a plurality of bidirectional translation corpora based on a context of the source phrase, wherein a unique bidirectional translation corpus is selected for web content in at least two portlets of a portal page;
    determining if the source phrase matches the first phrase in any entry in the bidirectional translation corpus; and
    using the second phrase as a translated phrase if a match is determined.

2. The method of claim 1, further comprising translating the source phrase using a translation system if a match is not determined.

3. The method of claim 2, wherein the translating step comprises:
    generating a source language structure based on the source phrase;
    converting the source language structure into a destination language structure; and
    generating the translated phrase using the destination language structure.

4. The method of claim 1, wherein the source phrase comprises a complete sentence.

5. The method of claim 1, further comprising enabling use of the bidirectional translation corpus based on a context of the source phrase.

6. The method of claim 1, wherein the context comprises at least one of: a source language, a destination language, a content area, and a display attribute.

7. A system for translating web content including a source phrase, the system comprising:
    a bidirectional translation corpus comprising a plurality of entries, each entry having a first phrase in a first language and a corresponding second phrase in a second language, wherein the bidirectional translation corpus implements translation of phrases from the first language to the second language and from the second language to the first language;
    a corpus system for selecting the bidirectional translation corpus based on the context, wherein a unique bidirectional translation corpus is selected for web content in at least two port lets of a portal page;
    a matching system for determining if the source phrase matches the first phrase in any entry in the bidirectional translation corpus; and
    a phrase system for using the second phrase as a translated phrase if a match is determined.

8. The system of claim 7, further comprising a corpus system for selectively enabling the matching system.

9. The system of claim 7, further comprising a corpus system for selecting one of a plurality of bidirectional translation corpora for use by the matching system.

10. The system of claim 7, wherein the source phrase comprises portlet data for a portlet, the system further comprising:
    a portal program for defining a context for the portlet.

11. The system of claim 7, further comprising a translation system for translating the source phrase if a match is not determined.

12. The system of claim 11, wherein the translation system includes:
    an analysis system for generating a source language structure based on the source phrase;
    a transfer system for converting the source language structure into a destination language structure; and
    a synthesis system for generating the translated phrase using the destination language structure.

13. A computer program product comprising a computer useable medium having computer readable program code embodied therein for translating web content having a source phrase, the program product comprising:
    program code configured to manage a bidirectional translation corpus comprising a plurality of entries, each entry having a first phrase in a first language and a corresponding second phrase in a second language, wherein the bidirectional translation corpus implements translation of phrases from the first language to the second language and from the second language to the first language;
    program code configured to select the bidirectional translation corpus based on the context, wherein a unique bidirectional translation corpus is selected for web content in at least two portlets of a portal page;
    program code configured to determine if the source phrase matches the first phrase in any entry in the bidirectional translation corpus; and
    program code configured to use the second phrase as a translated phrase if a match is determined.

14. The computer program product of claim 13, further comprising program code configured to translate the source phrase if a match is not determined.

15. The computer program product of claim 14, wherein the program code configured to translate includes:
    program code configured to generate a source language structure based on the source phrase;
    program code configured to convert the source language structure into a destination language structure; and
    program code configured to generate the translated phrase using the destination language structure.

16. The computer program product of claim 13, further comprising program code configured to enable use of the bidirectional translation corpus based on a context of the source phrase.

17. The computer program product of claim 13, further comprising program code configured to select the bidirectional translation corpus from a plurality of bidirectional translation corpora based on a context of the source phrase.

18. The computer program product of claim 13, wherein the web content comprises portlet data for a portlet, the computer program product further comprising:
    program code configured to define a context for the portlet.

* * * * *